March 10, 1925.
G. J. WINTER
HOSE COUPLING
Filed March 5, 1923
1,529,525
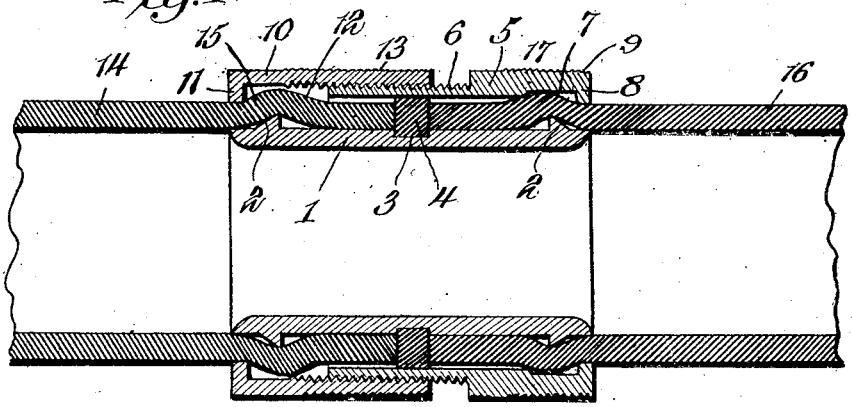
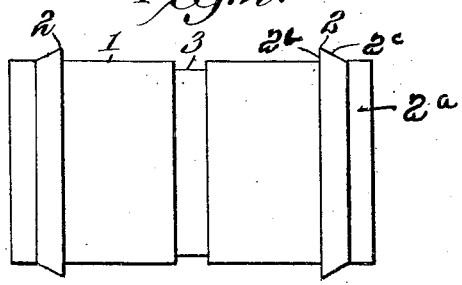
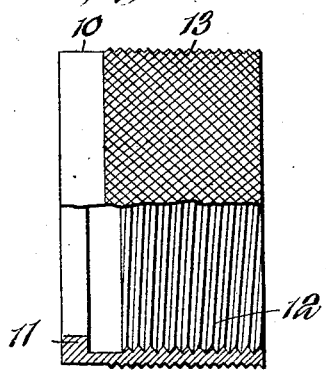 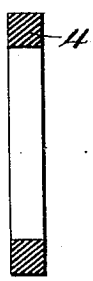 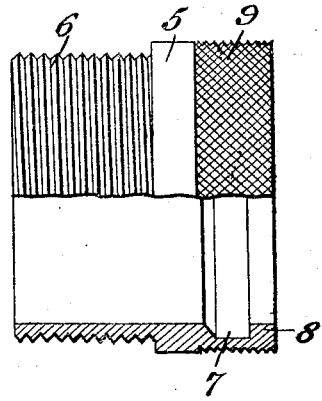
INVENTOR.
George J. Winter
BY James J. Sheehy & Co.
ATTORNEYS Patented Mar. 10, 1925.

1,529,525

UNITED STATES PATENT OFFICE.

GEORGE J. WINTER, OF BUFFALO, NEW YORK.

HOSE COUPLING.

Application filed March 5, 1923. Serial No. 623,013.

*To all whom it may concern:*

Be it known that I, GEORGE J. WINTER, a citizen of the United States, residing at Buffalo, in the county of Erie and State of New York, have invented new and useful Improvements in Hose Couplings, of which the following is a specification.

My present invention pertains to couplers and more particularly to those used by the conection of two sections of hose such for instance garden hose and it contemplates the provision of a simple and inexpensive device through the medium of which two sections of hose may be readily and easily connected and this without liability of disengagement of the sections of hose one from the other.

The invention further contemplates the provision of a coupler through the medium of which steam hose may be connected with a source of supply and leakage of steam or the like at the point of connection positively eliminated.

The invention further contemplates the provision of a coupler adapted for use with gas and air hose and is so constructed and arranged that irrespective of the pressure under which the hose is placed the sections will not part at the point of connection and therefore escape of the air or gas is effectually precluded.

The invention in all of its details will be fully understood from the following description and claim when the same are read in connection with the drawings accompanying and forming part of this specification, in which:—

Figure 1 is a longitudinal sectional view showing two sections of hose with my novel connection secured thereon.

Figure 2 is a side elevation of my novel interior nipple.

Figure 3 is a view partly in section and partly in side elevation of the left hand element of the exterior cap or connection.

Figure 4 is a similar view of the right hand cap or connection.

Figure 5 is a sectional view of the washer employed with my device.

Similar numerals of reference designate corresponding parts in all the views of the drawings.

My novel connection comprises the nipple body portion 1 that is provided with the flanges 2 that are arranged at a point slightly adjacent the ends of the nipple and as will be seen by reference to Figure 2 the said flanges are provided toward the center of the nipple with a sharp end $2^b$ and toward the ends of the nipple with the tapered wall $2^a$ for an important purpose hereinafter set forth.

As will be apparent from the further description of the invention the device or nipple is also provided with the portions $2^c$ which are also for a very important purpose.

Arranged in the center of the nipple and extending completely around the outer surface is a kerf or channel 3 for the reception and retention of an ordinary washer 4.

The nipple so far described is adapted to enter the ends of the hose sections 14 and 16 and when properly positioned within the closed sections the flanges 2 will cause the "hump" or beadings 15 and 17 to be produced near the ends of said sections of hose. It will be manifest that the extreme ends of the hose sections will abut snugly against the washer 4 that rests in the channel 3 of the nipple 1. It will be obvious that the straight or sharp edge $2^b$ of the flanges 2 will cut into the material of the hose sections and that the tapered walls $2^a$ of said flanges will cause the bead to be produced after the manner clearly shown in Figure 1.

By reference to Figure 1 it will be apparent that the outer collars or connections 5 and 10 are secured over the abutting ends of the hose and the right hand cap 5 is exteriorly threaded at 6 and exteriorly knurled at 9 and is provided with the outer downwardly extending portion 8 having a sharp inner wall that bears snugly against the bead 17 of the hose when the cap is properly positioned thereon. By reference to Figure 4 in particular it will be noted that the cap 5 is provided with the tapered wall 7 that is pitched toward the sharp edge of wall 8 of said cap.

The left hand cap 10 is provided with a wall 11 similar to the wall 8 and is interiorly threaded at 12 and exteriorly knurled at 13.

It will be apparent from the foregoing that when the interior nipple has been properly positioned the beads 15 and 17 will be produced on the hose and when the caps 5 and 10 are threaded one against the other, a tight connection is made and escape of the contents of the hose at the connection is prevented because of the fact that the downwardly extending walls 8 and 11 will bite into the bead of the sections of hose. When the connection has been properly adjusted parting of the hose cannot take place and any attempt to pull the sections of hose apart will merely tend to more firmly cause the outer caps to grip the beaded portions of the hose sections.

The nipple having the tapered portions 2ª on the flange as well as wall 2ᶜ acts as a guide for inserting the end of a hose section and the rubber washer stationarily arranged on the nipple permits the snug connection of two sections of hose irrespective of the irregular cut or configuration of the extreme ends of the sections.

The arrangement of the flanges 2 assures the automatic formation of bushings and bearing surfaces for the sharp edges of the collars 5 and 10 and therefore the said bushing produced acts as a packing and prevents escape of water and the like and in order to pull the sections apart it will be necessary to tear the hose unless the caps are unscrewed one from the other.

It will be apparent from the foregoing that the invention is extremely simple in construction and inexpensive to produce and may be removed and replaced with a very slight amount of effort and by one unskilled in making a connection and when properly adjusted the coupler will withstand a pressure up to at least 400 pounds.

I would distinctly have it understood that the coupler may be employed for the connection of one section of hose to a faucet or service outlet and when so employed the end 11 of the cap 10 may be interiorly threaded.

Having described my invention what I claim and desire to secure by Letters-Patent is:—

In a hose coupling, the combination with two conduits of flexible material, of a tube hollow throughout and adapted to be inserted in the ends of the conduits, a channel formed in the direct longitudinal center thereof and adapted to receive a washer of rubber or other flexible material; each end of the tube having a peripheral flange that is beveled toward the ends of the tube, whereby when the tube is inserted into the conduits a flange will be produced near the ends thereof, a collar having a flanged inner end that abuts against one of the flanges formed in the conduit and further having exterior threads adjacent its flange, a second collar interiorly threaded to engage the threads of the first collar and a flange interiorly arranged in the second collar to abut the flange produced in the second conduit.

In testimony whereof I have hereunto set my hand in presence of two subscribing witnesses.

GEORGE J. WINTER

Witnesses:
   FLORENCE M. SCUTT,
   ALICE E. ALDRICH.